United States Patent [19]

Toya et al.

[11] Patent Number: 4,529,265
[45] Date of Patent: Jul. 16, 1985

[54] OPTICAL FIBER JOINTS AND METHOD OF JOINING OPTICAL FIBERS

[75] Inventors: Shigeo Toya; Koichi Abe, both of Hitachi; Mitsumasa Zobuchi, Juo, all of Japan

[73] Assignee: Hitachi Cable, Ltd., Tokyo, Japan

[21] Appl. No.: 363,842

[22] Filed: Mar. 31, 1982

[30] Foreign Application Priority Data

Apr. 30, 1981 [JP] Japan ................................. 56-65689

[51] Int. Cl.³ ............................................... G02B 5/14
[52] U.S. Cl. .................................................. 350/96.21
[58] Field of Search ........................... 350/96.21, 320

[56] References Cited

U.S. PATENT DOCUMENTS

| 3,920,432 | 11/1975 | Smith | 350/96.21 |
| 4,371,233 | 2/1983 | Masuda | 350/96.21 |
| 4,403,243 | 9/1983 | Hakamada | 350/96.21 |

Primary Examiner—William L. Sikes
Assistant Examiner—Robert E. Wise
Attorney, Agent, or Firm—Antonelli, Terry & Wands

[57] ABSTRACT

An optical fiber joint and a method of forming such optical fiber joint being reinforced by a reinforcement material, having a prescribed coefficient of thermal expansion, integrally molded thereon by applying heat so as to obtain a predetermined thermal gradient in the reinforcing material, whereby bends in the optical fiber core wire joints are suppressed and the transmission loss of the optical fiber is reduced.

5 Claims, 12 Drawing Figures

OPTICAL FIBER JOINTS AND METHOD OF JOINING OPTICAL FIBERS

BACKGROUND OF THE INVENTION

1. Field of the Invention

The present invention relates to optical fibers and, more particularly, to optical fiber joints and a method of joining optical fibers a transmission loss and suppress bends of the optical fiber core wires.

2. Description of the Prior Art

As shown in FIGS. 1-3, in a conventional optical fiber joint optical fiber core wires 2 each have a a plastic layer 1a or 1b, with the joined fiber core wires 2 being inserted into a plastic tubing 3 to form a core wire joint, and with the plastic tubing 3 then being heated and pressed at or above a temperature of the melting point of the plastic tubing 3 by a mold which includes a top and bottom member 4a and 4b so as to mold the plastic tubing 3 together with the joined optical fibers. The mold is thereafter cooled and an optical fiber joint 5 is obtained.

In the above described conventional optical fiber joint, the same material or a material fusible with the plastic layer 1a or 1b such as, for example, nylon may be utilized as the plastic tubing 3, with the plastic tubing 3 being merely heated and pressed by the top and bottom molds 4a and 4b, so that the optical fiber joint 5 can relatively easily be formed.

However, in a disadvantage of the conventional optical fiber joints and methods of joining the same resides in the fact that, if nylon is used for the tubing 3, a bending of the optical fiber core 2 occurs due to differences between the coefficients of thermal expansion of an optical fiber joint 5 at the time of forming such joint and after a completion of the joining processes so that a transmission loss of the optical fiber increases, or in certain cases, there a generation of bends having a bending radius of 30 mm or less which remarkably increases transmission loss, since nylon has a coefficient of thermal expansion of about twenty times that of the optical fiber core wire 2, i.e., $100-130 \times 10^{-6}/°C.$ than larger that of the optical fiber core wire 2.

SUMMARY OF THE INVENTION

Accordingly, an object of the present invention is to provide optical fiber joints and a method of forming such joints whereby bends of the optical fiber core wires are suppressed and the transmission loss of the optical fiber is reduced.

Another object of the present invention is to provide optical fiber joints and a method of forming the same wherein no air bubbles or voids, promoting bends of the optical fiber core wire are generated. In this connection, if air bubbles or voids are generated, the optical fiber buckles and there is a possibility of breakage of the optical fiber.

In order to attain the above objects, the optical fiber joints according to the present invention comprise a reinforcing mold member for reinforcing the optical fiber core wire joints, with the reinforcing mold member having a coefficient of thermal expansion of $14 \times 10^{-6}/°C.$ or less. Moreover, the method of the present invention includes heating and pressing the core wire joint enveloped by the reinforcing mold with the heat being applied so as to cause a thermal gradient of 30°-70° C. which decreases from the central portion of the mold reinforcement material to the opposite ends thereof at a time when the reinforcing mold member is formed.

In accordance with a preferred embodiment of the present invention, the reinforcing mold member is composed of a composite reinforcement material prepared by arranging a material with a low thermal expansion coefficient such as, for example, glass fibers and a plastic material such as, for example, nylon in a laminar disposition. In this case, when a volume content of the glass fibers is fixed at 20%, a coefficient of thermal expansion of $14 \times 10^{-6}/°C.$ is obtained. Besides, this volume content must be fixed at 70% or less because of other reasons mentioned hereinbelow.

Furthermore, the outermost and innermost layers of the composite reinforcement material are made of a plastic material such as, for example, nylon, and the outermost layer of the composite reinforcement material must be within a volume ratio of 40-90% with respect to the total nylon content. If the volume ratio is 40% or less, the glass fibers are exposed from the surface of the composite reinforcement material, so that it is liable to cause cracks, whereas, if the nylon content in the outermost layer of the composite reinforcement material is 90% or more, a ratio of the nylon content in the innermost layer decreases, so that there is a deterioration of the adhesiveness with respect to the glass fibers at the time of joining optical fibers together.

In addition, other than nylon, in accordance with the present invention, it is also possible to use polyamide series synthetic resins, polyvinyl series synthetic resins, polyethylene series synthetic resins. On one hand, other than glass fibers, silicon carbide, aromatic polyamide resins and the like may suitably be utilized for the materials with a low coefficient of thermal expansion.

DETAILED DESCRIPTION

Figure 1:
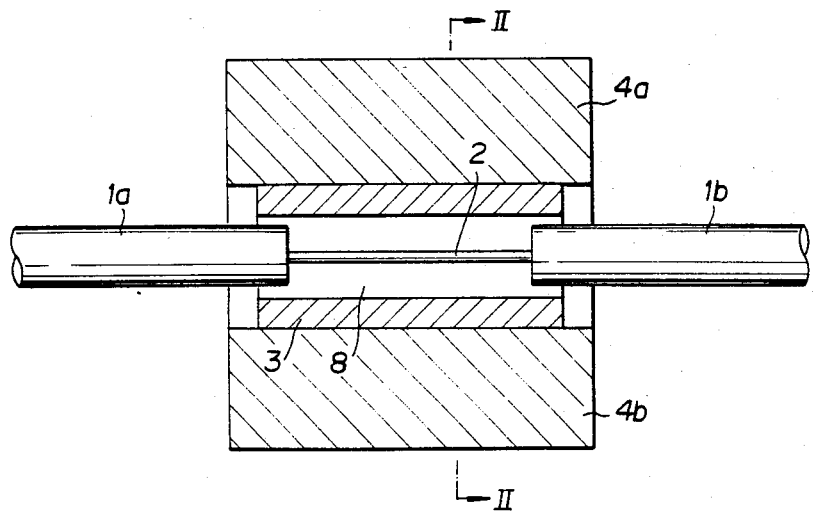
FIG. 1 is a sectional view of an example of a conventional method of joining optical fibers.
Figure 2:
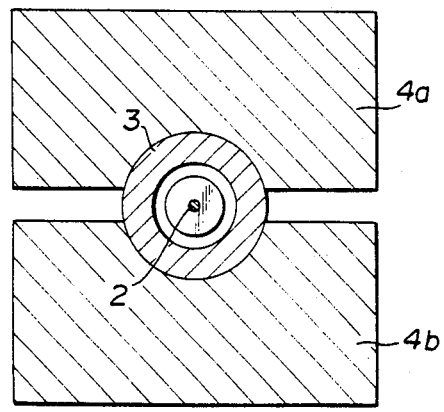
FIG. 2 is a sectional view taken along line II—II in FIG. 1.
Figure 3:
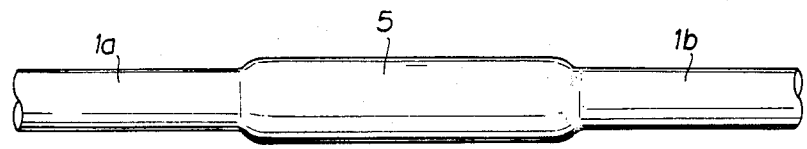
FIG. 3 is a perspective view of a conventional optical fiber joint.
Figure 4A:
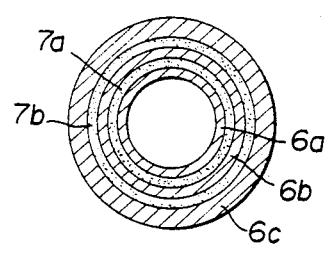
FIGS. 4A and 4B are sectional views of composite reinforcement materials and an optical fiber joint according to the present invention.

Referring now to the drawings, wherein like reference numerals designate like or corresponding parts throughout the several views, and, more particularly, to FIG. 4A, according to this figure, a reinforcing composite tubing includes three layers 6a, 6b and 6c of a plastic material and two layers 7a and 7b of glass fibers. In this case, comparatively long fibers are used as the glass fibers with the content of the glass fibers being fixed at about 30% by taking the mechanical properties and thermal expansion coefficient of the reinforcing mold joint into consideration. Further the layers 6a, 6b and 6c may be the same in material as layers of the optical fiber and the thickness of both the first and second layers 6a and 6b of the plastic material is of 0.2 mm, respectively, and only the outermost layer 6c is of 0.5 mm.

Figure 4B:
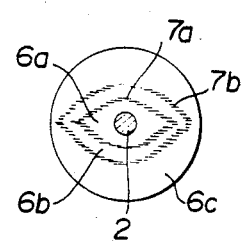

By inserting an optical fiber the composite tubing described hereinabove prior to joining glass optical fiber core wires together by means of fusing or bonding and then sliding the composite tubing over the core wire joint after joining the core wires, and molding the composite tubing by top and bottom molds an optical fiber joint such as shown in FIG. 4B can be obtained.

To manufacture the above described composite tubing, a plastic material is first coated on a metal wire, glass fibers are then aligned around the outer circumference of the resulting metal wire to wrap or intertwine the glass fibers with each other, and further plastic material is extruded to cover the outer circumference of the treated glass fibers, with such steps being repeated until a required number of layers is formed. Finally, when the core metal wire is drawn out of the resulting formed article, a composite tubing according to the invention can be obtained.

Figure 5:
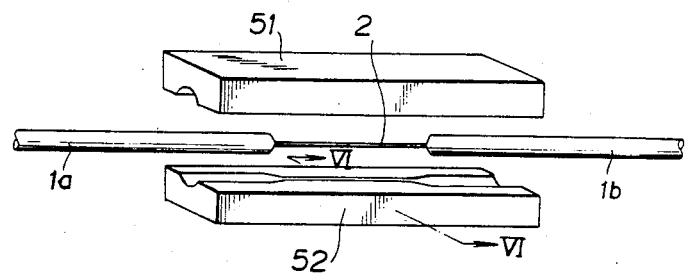
FIG. 5 is a perspective view of composite reinforcement materials in another embodiment of the optical fiber joint according to the present invention.
Figure 6:
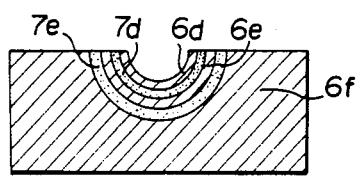
FIG. 6 is a sectional view taken along line VI—VI in FIG. 5.

Instead of a composite tubing, as shown in FIG. 5, a plate-like material of a non-circular cross section may be used as a composite material for reinforcing the optical fiber joint 5. More particularly, the composite material includes an upper composite panel 51 and a lower composite panel 52, with each of the composite panels 51, 52 having a cross-section shown most clearly in FIG. 6. The composite panels 51, 52 are formed as an alternating laminated product including layers 6d, 6e, 6f of a plastic material which is the same material or a material which is fusable with the glass fibers disposed in layers 7d, 7e, 7f. When an optical fiber core wire joint 2 is sandwiched between the composite panels 51, 52 and the composite panels 51, 52 are subjected to hot molding, an optical fiber joint having excellent mechanical properties can be obtained.

Figure 7:
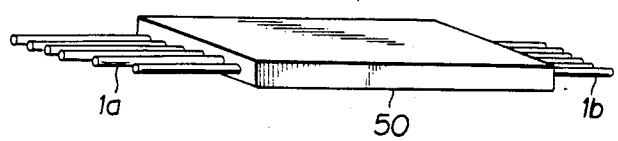
FIG. 7 is a perspective view showing still another embodiment of the optical fiber joint according to the present invention.

In the case where only a pair of optical fibers are to be joined one another, the composite tubing is characteristically excellent, while the composite panels 51, 52 is excellent in the case where there are multiple pairs of optical fibers to to joined, because multiple pairs of optical fiber joints can be simultaneously reinforced by means of the composite panels 51, 52. More particularly, as shown in FIG. 7, by disposing multiple pairs of optical fibers between the pair of composite panels 51, 52, it is possible to integrally mold the multiple pairs of optical fibers so as to have a joining portion composed of the upper and lower composite panels 51, 52 by a molding thereof.

Figure 8:
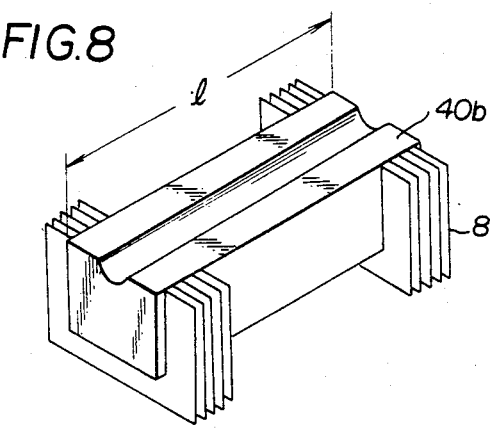
FIG. 8 is a perspective view showing a metallic mold utilized in a method of joining optical fibers according to the present invention.

To manufacture the composite tubing, metallic mold for hot-molding the composite tubing together with an optical fiber joint, with the metallic mold including a pair of complimentary mold members, with each mold member having a construction shown most clearly in FIG. 8. More particularly, as shown in FIG. 8, a metallic mold member 40b has a plurality of radiation fins 8 attached to respective ends thereof. Alternatively, it is also possible, in a manner not shown in the drawings, to provide a metallic mold wherein a temperature at a central part thereof is raised by a heater built into the metallic mold.

Figure 9:
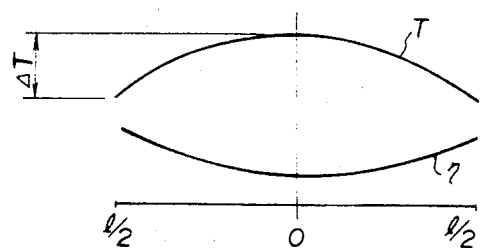
FIG. 9 is a graphical representation illustrating temperature gradient and viscosity gradient in a method of joining optical fibers in accordance with the present invention.

By virtue of a construction of the metallic mold described above, temperature distribution T with respect to a longitudinal length l of the mold as illustrated in FIG. 9. Namely, a center 0 in the metallic mold has the maximum temperature and there is a temperature gradient $\Delta t$ towards either end l/2 of the metallic mold, and a viscosity of the plastic material has a minimum value at the center 0 of the metallic mold as shown by the curve $\eta$ in FIG. 9.

In the case when the composite tubing is pressed by utilizing the above-described metallic mold, air in the composite tubing is gradually forced out of the interior of the tubing, so that there is no inclusion of an air bubble in the optical fiber joint. Experiments have demonstrated that, if nylon is utilized as the plastic material, the optical fiber joint does not include any air bubbles at a thermal gradient $\Delta T$ in the range of 30°–70° C., so that it is possible to obtain highly reliable optical fiber joints.

It is to be noted that a probability in which air bubbles each having more than 1 mm diameter are generated at a temperature gradient $\Delta T$ is 20° C. was seven cases per one-hundred cases. On the other hand, in the case where a thermal gradient $\Delta T$ is 70° C. or more, the central part of the metallic mold reaches excessively high temperatutes before the temperature at the ends of the metallic mold rises to or above the melting point of nylon, and, consequently, the nylon deteriorates so that the optical fibers are broken, or the light transmission characteristics are adversely affected.

Figure 10:
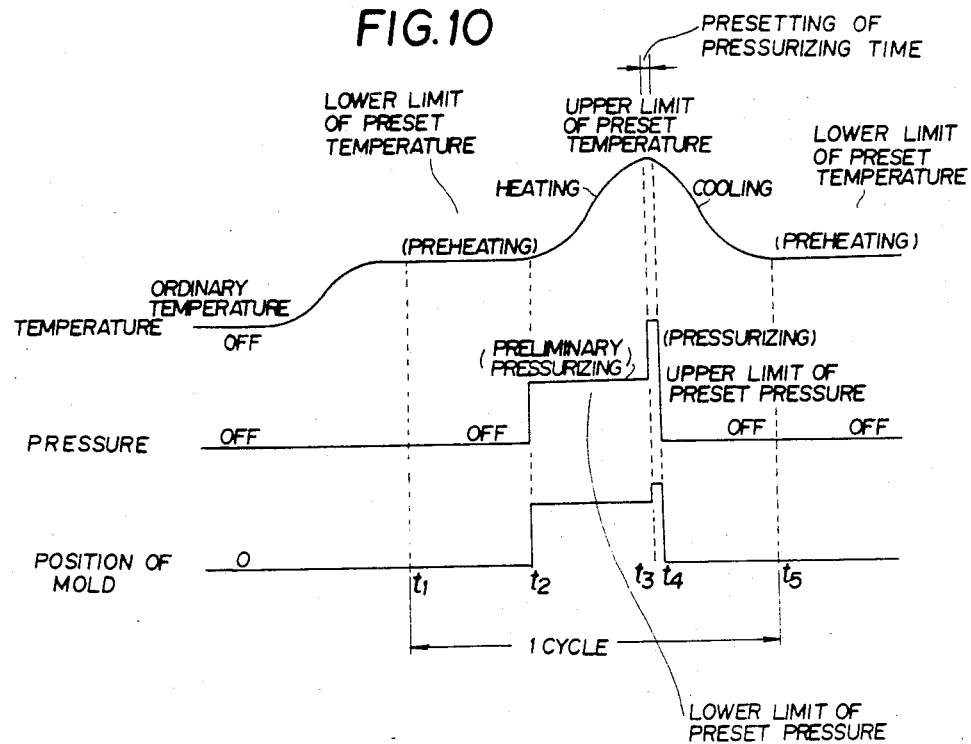
FIG. 10 is a graphical representation illustrating an embodiment of a method of joining optical fibers in accordance with the present invention.

FIG. 10 provides a graphical representation of one cycle $t_1$–$t_5$ of the molding process wherein the upper and lower temperature limit in the metallic mold are preset in accordance with the construction of an optical fiber joint, the upper and lower pressures for pressing in the metallic mold are preset, and a time period for pressing in the metallic mold under the upper limit pressure is also preset so as enable a controlling the temperature, pressure and time through the combination thereof.

To obtain the results illustrated in FIG. 10, a metallic mold was employed and an optical fiber joint and a composite tubing or disposed on the bottom mold member when separated from the top mold member, and thereafter a temperature of the metallic mold was preset at the lower limit $t_1$. The top mold member was then brought into contact with the bottom mold member and both mold members were heated while pressing them under a lower limit pressure for a time period $t_2$. After the temperature reaches the upper limit thereof at time period $t_3$, the pressure at the upper limit was applied in the metallic mold for a predetermined short period of time. Thereafter, after the time period $t_4$, the top mold member was separated from the bottom mold member and at the same time, the mold members were cooled and the optical fiber joint removed from the metallic mold at the time period $t_5$.

In the above case, specific values of the preset temperatures vary in dependence upon the materials and dimensions thereof; however, with nylon being used as the plastic material the lower limit of preset temperature is around 120° C., the upper limit of preset temperature is around 200° C. at the central part of the metallic mold, and around 150° C. at the opposite ends of the mold.

Figure 11:
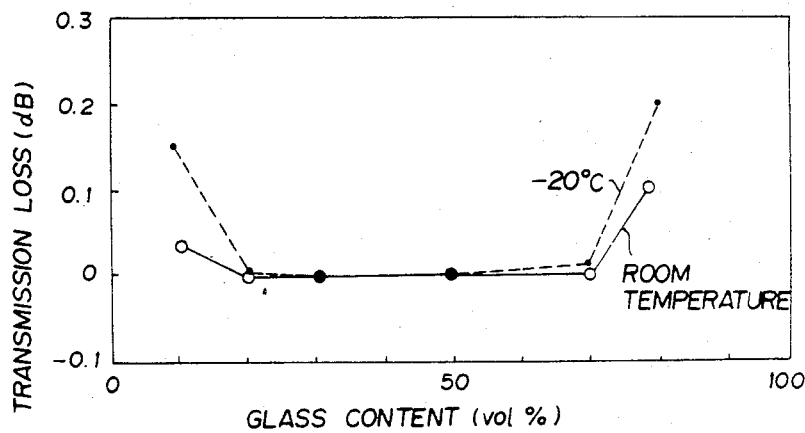
FIG. 11 is a graphical representation showing transmission loss characteristics in the optical fiber joint according to the present invention.

FIG. 11 is a graphical representation of a relationship between transmission loss and glass content $G_c$ of the optical fiber joints obtained in with the embodiments shown in FIGS. 4A, 4B and 5. As shown in FIG. 11, when the Gc is 20% or less, the influence of the thermal expansion coefficient of nylon becomes remarkable, whereas, when the Gc is 70% or more, nylon does not sufficiently permeate in glass fibers, and as a result thereof, the adhesiveness of the nylon with respect to the glass fiber decreases so that the advantageous effects of the glass fibers also decrease. For this reason, bends are liable to be generated in the optical fiber core wires in the where the Gc is 20% or less as well as the Gc is 70% or more. Consequently, the transmission loss increases rapidly. The thermal expansion coefficient of nylon in the case where the Gc is 20% was $14 \times 10^{-6}/°C$.

The invention may be embodied in other specific forms without departing from the spirit or essential characteristics thereof. The present embodiments are therefore to be considered in all respects as illustrative and not restrictive, with the scope of the invention being indicated by the appended claims rather than by the foregoing description and all changes which come within the meaning and range of equivalency of the claims are therefore intended to be embraced therein.

What is claimed is:

1. An optical fiber joint comprising optical fiber core wires joined together to form a core wire joint, and reinforcing mold means for completely enveloping an outer periphery of said core wire joint, said reinforcing mold means have a coefficient of thermal expansion equal to or less than $14 \times 10^{-6}/°C$.

2. An optical fiber joint as claimed in claim 1, wherein said reinforcing mold means includes a plurality of layers of a plastic material, and a material having a low coefficient of thermal expansion, said plastic material and said material having a low coefficient of thermal expansion being arranged in a laminar form, with said plastic material forming at least an inner most and outermost layer of the laminar form.

3. An optical fiber joint as claimed in claim 2, wherein said plastic material is nylon, said material having a low coefficient of thermal expansion includes glass fibers, and the outermost layer has a nylon content volume ratio of 40–90%.

4. A method of joining optical fibers, the method comprising the steps of:
   joining optical fiber core wires together to form a core wire joint;
   enveloping an outer periphery of the core wire joint by a mold reinforcement means having a coefficient of thermal expansion of $14 \times 10^{-6}/°C$., and
   heating and pressing said reinforcement means, with the heat being applied so as to yield a predetermined thermal gradient in said reinforcement means from a central part thereof to opposite ends thereof.

5. A method of joining optical fibers as claimed in claim 4, wherein said thermal gradient is in a range of 30°–70° C.

* * * * *